(12) United States Patent
Kuretake

(10) Patent No.: US 12,728,772 B2
(45) Date of Patent: Sep. 8, 2026

(54) SEAT CONTROL DEVICE

(71) Applicant: TOYOTA JIDOSHA KABUSHIKI KAISHA, Toyota (JP)

(72) Inventor: Ken Kuretake, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 301 days.

(21) Appl. No.: 18/197,294

(22) Filed: May 15, 2023

(65) Prior Publication Data

US 2023/0406162 A1 Dec. 21, 2023

(30) Foreign Application Priority Data

May 19, 2022 (JP) ................................ 2022-082603

(51) Int. Cl.
*B60N 2/02* (2006.01)

(52) U.S. Cl.
CPC ................................. *B60N 2/0276* (2013.01)

(58) Field of Classification Search
CPC .......... B60N 2/0276; B60N 2002/0216; B60N 2/0268; B60N 2/0278; B60N 2/026; B60N 2/14; B60N 2/18; B60N 2/0244; B60N 2/501; B60N 2/502
USPC ........................................................ 701/49
See application file for complete search history.

(56) References Cited

U.S. PATENT DOCUMENTS

2016/0082935 A1* 3/2016 Kim .................... B60T 8/17558 701/70
2021/0094570 A1* 4/2021 Uchida ................ B62D 15/025
2021/0114553 A1* 4/2021 Awtar .................. B60N 2/0244

FOREIGN PATENT DOCUMENTS

JP 2010000983 A * 1/2010
JP 2018118532 A * 8/2018
JP 2020-090181 6/2020

* cited by examiner

*Primary Examiner* — Hitesh Patel
*Assistant Examiner* — Ashleigh Nicole Turnbaugh
(74) *Attorney, Agent, or Firm* — Dinsmore & Shohl LLP

(57) ABSTRACT

A seat control device is provided that controls driving of an actuator for changing a posture of a seat in braking, in which, in a case when determining that a sinking behavior in which a front portion of the seat moves downward from a position before the braking is generated, the seat control device executes first control of causing the actuator to output force in a direction opposite to pitch angular velocity of the seat, and in a case when determining that a rocking-back behavior in which the front portion of the seat moves upward from the position before the braking is generated after the execution of the first control until a stop of the vehicle, the seat control device executes second control of causing the actuator to output force in a same direction as the pitch angular velocity of the seat.

5 Claims, 6 Drawing Sheets

SPRUNG MASS

UNSPRUNG MASS

SEAT CONTROL DEVICE

CROSS-REFERENCE TO RELATED APPLICATION(S)

The present application claims priority to and incorporates by reference the entire contents of Japanese Patent Application No. 2022-082603 filed in Japan on May 19, 2022.

BACKGROUND

The present disclosure relates to a seat control device.

Japanese Laid-open Patent Publication No. 2020-090181 discloses a seat control device that controls a posture of a seat on which an occupant of a vehicle is seated. The seat control device controls an actuator capable of rotating the seat in a pitch direction, a yaw direction, and a roll direction. In the configuration described in Japanese Laid-open Patent Publication No. 2020-090181, in a case where a vehicle body is inclined in a front-rear direction due to sudden deceleration or sudden acceleration of a vehicle, the actuator is operated and the seat is rotated in the pitch direction on the basis of a detection value of a pitch rate sensor, whereby a seat cushion is maintained to be horizontal.

SUMMARY

There is a need for providing a seat control device capable of appropriately controlling a posture of a seat on which an occupant of a vehicle is seated at the time of braking of the vehicle.

According an embodiment, there is provided a seat control device that controls driving of an actuator for changing a posture of a seat on which an occupant of a vehicle is seated and that controls the posture of the seat in braking of the vehicle, in which in a case when determining that a sinking behavior in which a front portion of the seat moves downward from a position before the braking is generated at a start of the braking of the vehicle, the seat control device executes first control of causing the actuator to output force in a direction opposite to pitch angular velocity of the seat, and in a case when determining that a rocking-back behavior in which the front portion of the seat moves upward from the position before the braking is generated after the execution of the first control until a stop of the vehicle, the seat control device executes second control of causing the actuator to output force in a same direction as the pitch angular velocity of the seat.

BRIEF DESCRIPTION OF THE DRAWINGS

FIG. 1 is a view illustrating a vehicle on which a seat control device is mounted according to an embodiment;

DETAILED DESCRIPTION

In the related art, as vibrations in a pitch direction which vibration is generated in a seat in response to a shake of a vehicle at the time of braking of the vehicle, there are a sinking behavior generated at the start of the braking and a rocking-back behavior generated until the vehicle stops thereafter. However, in the configuration described in Japanese Laid-open Patent Publication No. 2020-090181, there is a possibility that the sinking behavior and the rocking-back behavior of the seat which behaviors are generated at the time of the braking of the vehicle cannot be accurately detected, a posture of the seat cannot be appropriately controlled from the start of the braking until the stop of the vehicle, and ride comfort is deteriorated.

In the following, a seat control device in embodiments of the present disclosure will be described in detail with reference to the drawings. Note that the present disclosure is not limited to the embodiments described in the following.

Figure 1:
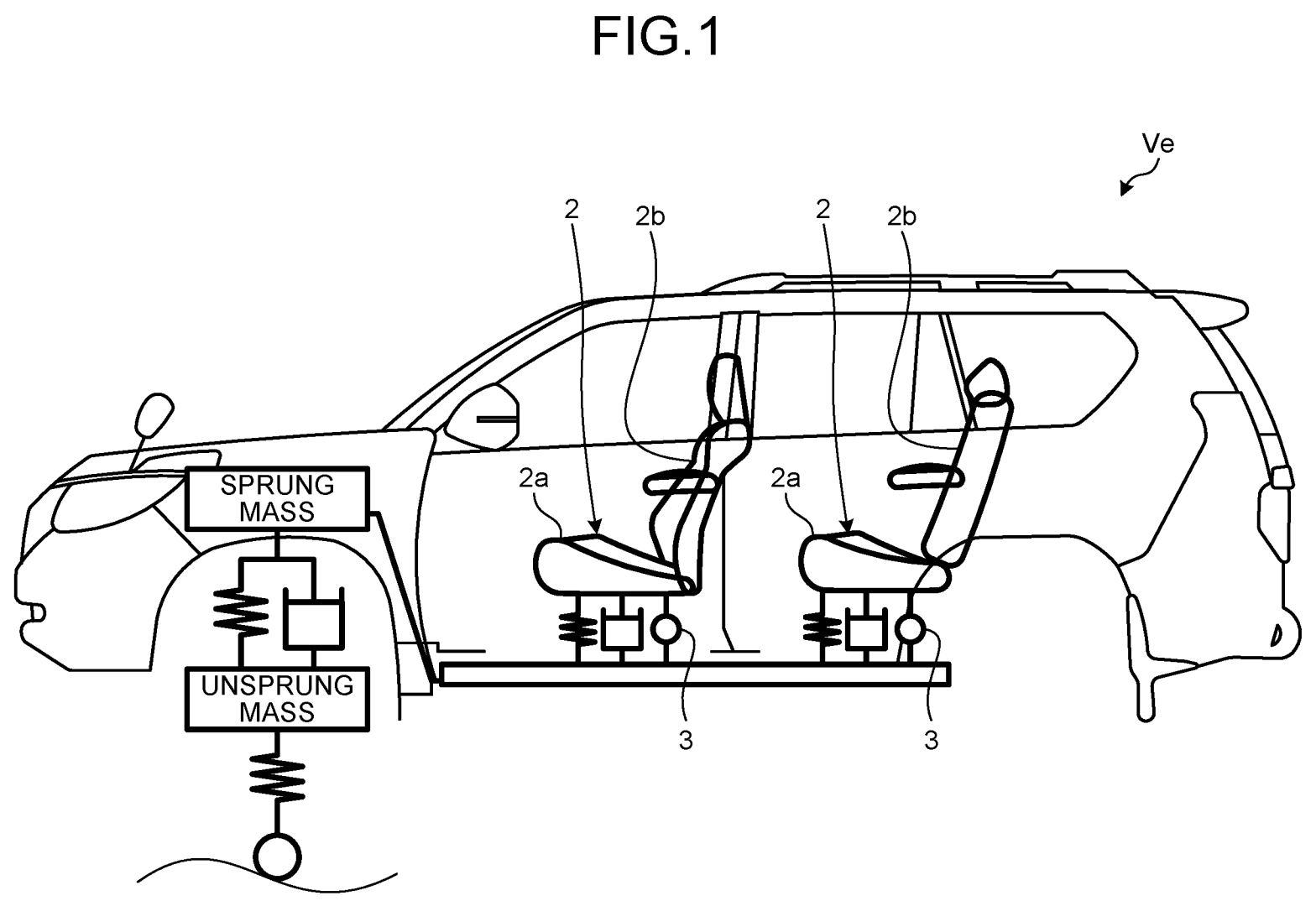

FIG. 1 is a view illustrating a vehicle on which a seat control device is mounted according to an embodiment. With a seat 2 provided in a vehicle Ve being a target, a seat control device 1 controls a posture of the seat 2. The seat control device 1 is mounted on the vehicle Ve. The seat control device 1 is configured to control a posture of the seat 2 to an appropriate posture against a shake of the vehicle Ve which shake is generated at the time of braking of the vehicle Ve.

Figure 2:
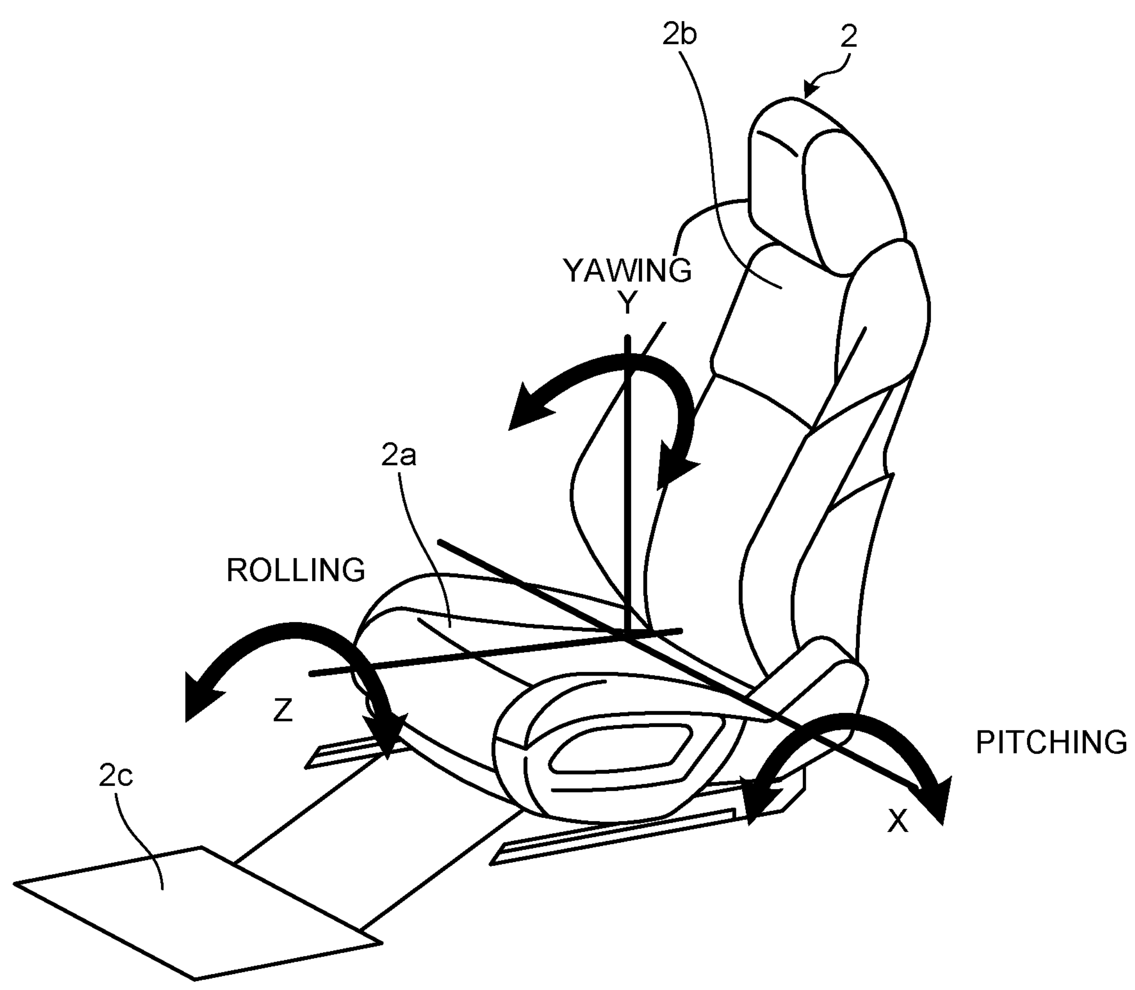
FIG. 2 is a perspective view for describing a seat and an actuator according to an embodiment.

The seat 2 is provided on a floor of the vehicle Ve, and an occupant of the vehicle Ve is seated on the seat 2. A plurality of the seats 2 such as a driver seat, a passenger seat, and a rear seat is provided in the vehicle Ve. As illustrated in FIG. 2, each of the seats 2 includes a seat cushion 2*a* having a seat surface, a seat back 2*b* that supports the back of the occupant, and a footrest portion 2*c* on which feet of the occupant is placed. When the seat cushion 2*a* moves in a pitch direction while the vehicle Ve is traveling, the seat back 2*b* and the footrest portion 2*c* move in the pitch direction integrally with the seat cushion 2*a*. Then, a posture of the seat 2 is changed by driving of an actuator 3.

The actuator 3 is a driving device capable of changing the posture of the seat 2. The actuator 3 is an actuator configured to be able to rotate the seat 2 in the pitch direction of the vehicle Ve.

As illustrated in FIG. 2, the actuator 3 can rotate the seat 2 in three axes of the pitch direction, a yaw direction, and a roll direction. For example, the actuator 3 includes a first actuator that drives the seat 2 to rotate in the pitch direction, a second actuator that drives the seat 2 to rotate in the yaw direction, and a third actuator that drives the seat 2 to rotate in the roll direction. When the actuator 3 is driven, the posture of the seat 2 can be changed in the pitch direction, the yaw direction, and the roll direction. Then, driving of the actuator 3 is controlled by the seat control device 1.

Figure 3:
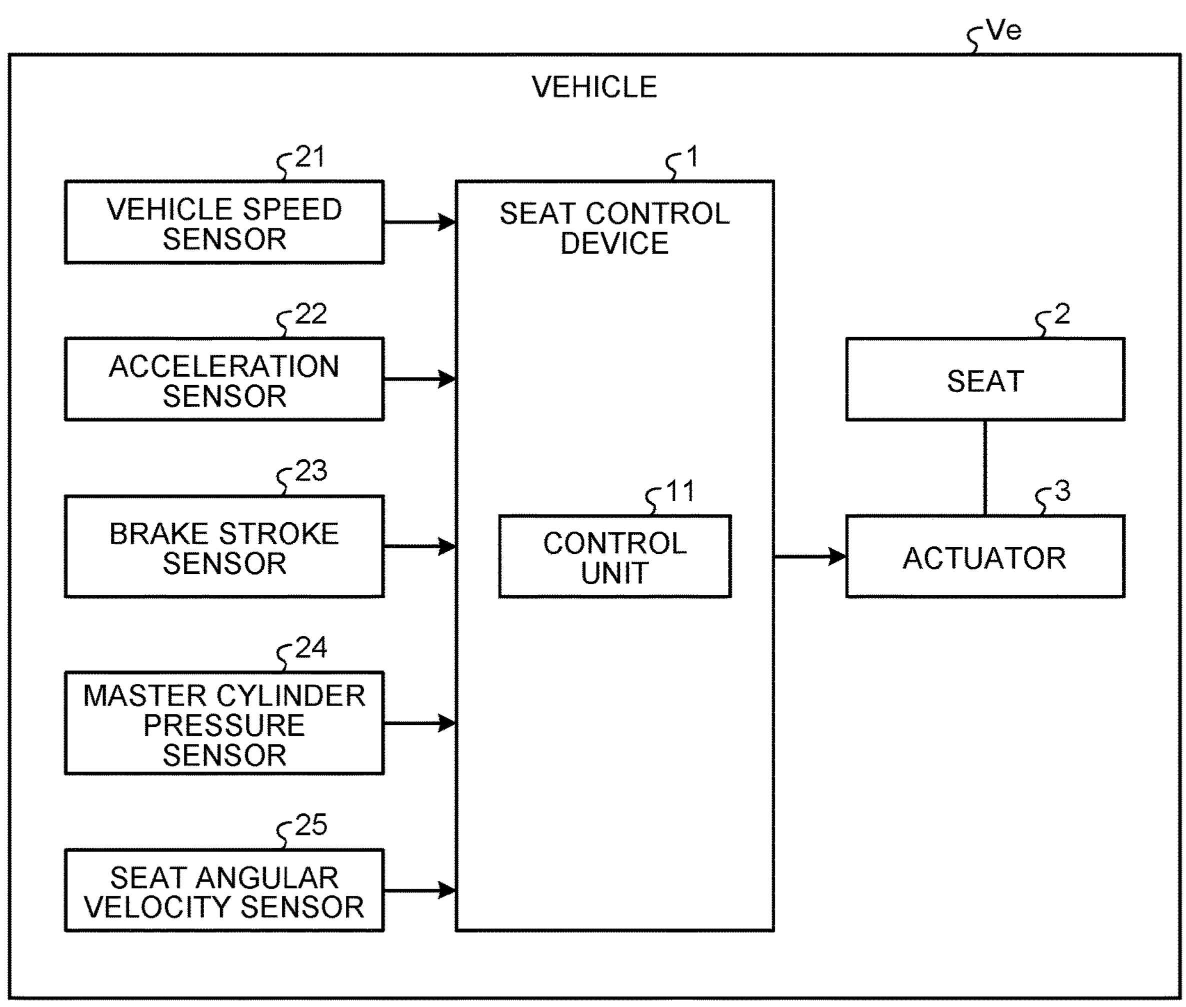
FIG. 3 is a block diagram for describing a seat control device according to an embodiment.

FIG. 3 is a block diagram for describing the seat control device.

The seat control device 1 is an electronic control device that controls the vehicle Ve. The electronic control device includes a microcontroller including a CPU, a RAM, a ROM, and an input/output interface. The seat control device 1 performs signal processing according to a program stored in advance in the ROM. Signals from various sensors mounted on the vehicle Ve are input to the seat control device 1.

As the signals input to the seat control device 1, there are a signal from a vehicle speed sensor 21, a signal from an acceleration sensor 22, a signal from a brake stroke sensor 23, a signal from a master cylinder pressure sensor 24, a signal from a seat angular velocity sensor 25, and the like. The vehicle Ve includes the vehicle speed sensor 21 that detects a vehicle speed, the acceleration sensor 22 that detects longitudinal acceleration of the seat 2, the brake stroke sensor 23 that detects a pedaling amount of a brake pedal, the master cylinder pressure sensor 24 that detects a brake pedal force, and the seat angular velocity sensor 25 that detects angular velocity in the pitch direction (hereinafter, referred to as pitch angular velocity) of the seat 2. The vehicle speed sensor 21 outputs a vehicle speed signal. The acceleration sensor 22 outputs a seat longitudinal acceleration signal (seat longitudinal G signal). The brake stroke sensor 23 outputs a brake signal. The master cylinder pressure sensor 24 outputs a master cylinder pressure signal. The seat angular velocity sensor 25 outputs a seat angular velocity signal. Then, the seat control device 1 executes various kinds of control on the basis of the signals input from the various sensors.

For example, the seat control device 1 executes seat control to control the posture of the seat 2 at the time of braking of the vehicle Ve. In this case, the seat control device 1 detects pressing on the brake pedal from the signal input from the brake stroke sensor 23 and executes the seat control. The seat control device 1 includes a control unit 11 that executes the seat control. The seat control includes first control of causing the actuator 3 to output force in a direction opposite to the pitch angular velocity of the seat 2, and second control of causing the actuator 3 to output force in the same direction as the pitch angular velocity of the seat 2. The control unit 11 controls driving of the actuator 3 in such a manner that the seat 2 takes an appropriate posture at the time of braking of the vehicle Ve. At that time, the control unit 11 selectively uses the first control and the second control according to a situation.

As described above, the seat control device 1 appropriately changes the posture of the seat 2 according to the pedaling amount of the brake pedal and controls a vibration in the pitch direction of the occupant seated on the seat 2. At that time, the seat control device 1 executes the seat control on the assumption of a shake of the vehicle Ve generated not only at the time of the start of braking, such as a time point at which sudden braking is generated, but also after the braking is started until the vehicle is stopped. The seat control includes control with respect to a sinking behavior of the seat 2 at the start of the braking, and control with respect to a rocking-back behavior generated thereafter. That is, as a scene in which the seat control is executed, there is a scene until the vehicle Ve decelerates and stops when a driver presses the brake pedal during traveling of the vehicle Ve. In this scene, the seat control device 1 controls the posture of the seat 2 by controlling the driving of the actuator 3 in such a manner as to separate the occupant from the shake of the vehicle Ve, which shake is generated by rocking back from the sudden braking, and to control the vibration of the occupant in the pitch direction.

Specifically, at the time of sudden braking, a front portion of the vehicle Ve sinks downward immediately after the start of braking. The vibration in the pitch direction which vibration is generated in the seat 2 at that time is first angular velocity which is a first wave due to the sinking. A direction of the first angular velocity is a rotation direction in which a front portion of the seat 2 moves downward from a position before the braking. At the time of the sudden braking, a behavior in which the seat 2 sinks down is generated as the vehicle Ve sinks down. Thus, in a case where a change rate in the pitch angular velocity of the seat 2 is large, the seat control device 1 applies force in an opposite phase to the first angular velocity by the actuator 3, and controls the sinking of the seat 2 and the movement of the occupant due to the sinking. In this case, the control unit 11 executes the first control in the seat control.

Furthermore, before the vehicle Ve stops, a rocking-back phenomenon due to longitudinal acceleration is generated. Thus, a rocking-back behavior due to the longitudinal acceleration is generated in the seat 2. The vibration in the pitch direction which vibration is generated in the seat 2 becomes second angular velocity that is a second wave of the rocking back. A direction of the second angular velocity is a rotation direction in which the front portion of the seat 2 moves upward from a position before the braking. That is, the second angular velocity acts in a direction opposite to that of the first angular velocity. Then, when the pitch angular velocity of the seat 2 shifts from a front to a rear direction by the generation of the second angular velocity in a state in which the longitudinal acceleration acting on the seat 2 is in a constant direction (rear direction) since the braking is performed, the upper body of the occupant is separated from the seat back 2*b*. In order to control this, in a case where it is determined that the rocking-back behavior of the seat 2 is generated, the seat control device 1 controls the posture of the seat 2 by applying force in the same phase as the second angular velocity by the actuator 3. By outputting the force in the same phase as the second angular velocity from the actuator 3, it is possible to move the front portion of the seat 2 upward from the position before the braking, and to incline the seat 2 backward in a direction in which the upper body of the occupant seated on the seat cushion 2*a* is pressed against the seat back 2*b*. As a result, forward movement of the upper body of the occupant seated on the seat 2 is controlled, and the upper body of the occupant can be settled on a side of the seat back 2*b*. In this case, the control unit 11 executes the second control in the seat control.

Then, as the vibration in the pitch direction which vibration is generated in the seat 2, there is third angular velocity that is a third wave of the rocking back. A direction of the third angular velocity is a rotation direction in which the front portion of the seat 2 moves downward from the position before the braking. The seat control device 1 controls the posture of the seat 2 in an opposite phase to the third angular velocity that is the vibration of the rocking back, controls the shake of the seat 2, and effectively controls the vibration to the occupant. In this case, the control unit 11 executes the first control in the seat control.

In such a manner, in a case where the pitch angular velocity of the seat 2 is large immediately after the start of the braking at the time of the braking of the vehicle Ve, the sinking of the seat 2 is controlled by application of the opposite phase. Subsequently, at a time point at which the vibration caused by the braking is settled to some extent, the same phase is applied to settle the upper body of the occupant. Then, when the upper body of the occupant is settled, the opposite phase is applied again and the shake of the seat 2 is controlled.

In addition, since the plurality of seats 2 is provided in the vehicle Ve, the seat control device 1 is configured to execute the seat control for each of the seats 2. That is, the seat control device 1 controls driving of each of the actuators 3 provided in the seats 2. Thus, the control unit 11 executes the first control and the second control for each of the seats 2.

Figure 4:
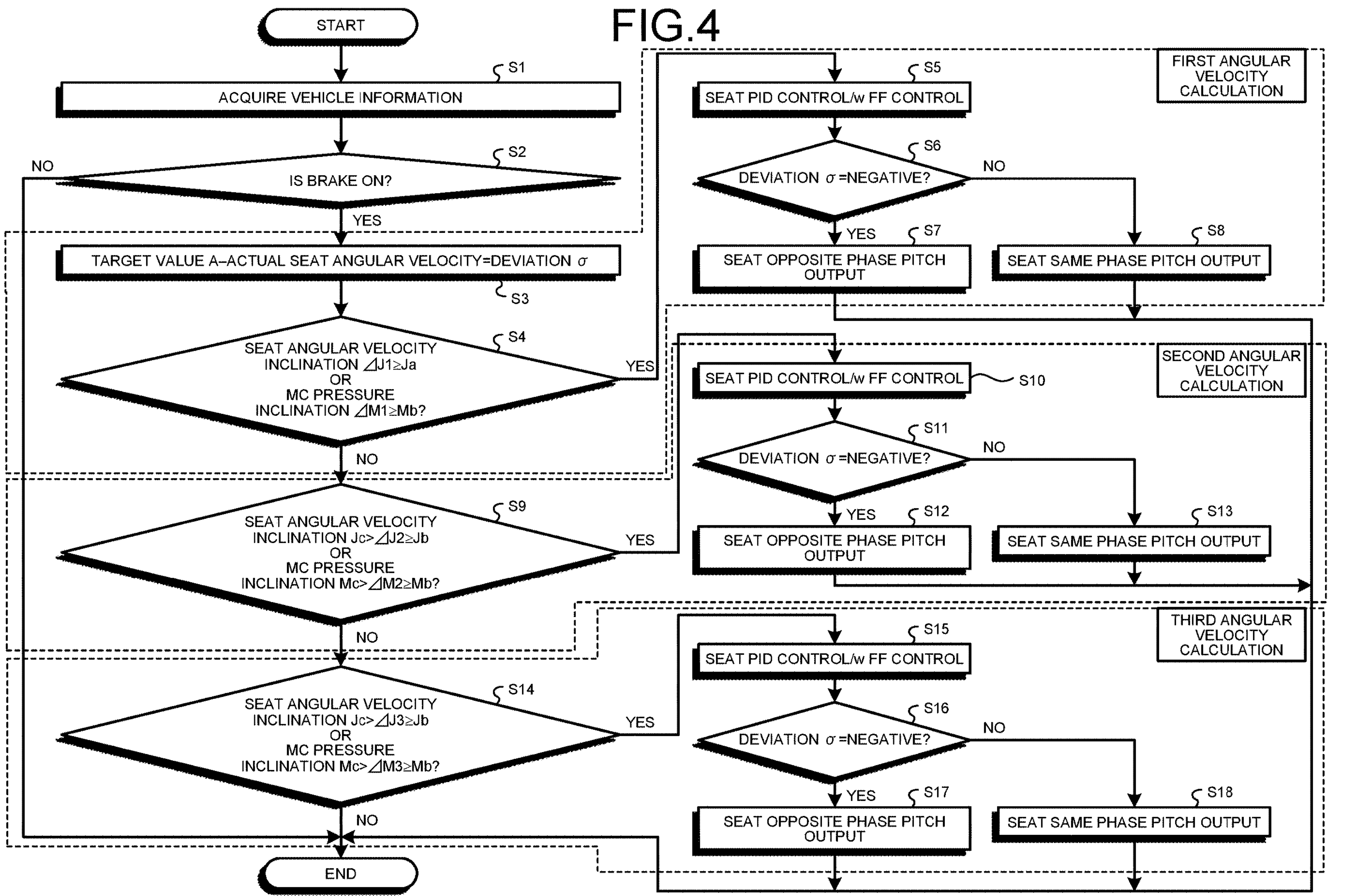
FIG. 4 is a flowchart illustrating processing of seat control according to an embodiment.

FIG. 4 is a flowchart illustrating processing of the seat control. The processing illustrated in FIG. 4 is repeatedly executed by the control unit 11 of the seat control device 1 during traveling of the vehicle Ve.

While the vehicle Ve is traveling, the control unit 11 acquires vehicle information (Step S1). In Step S1, a vehicle speed, a brake signal, a master cylinder pressure, seat angular velocity, and longitudinal acceleration are acquired as the vehicle information. The vehicle speed is a current vehicle speed acquired according to a signal from the vehicle speed sensor 21. The brake signal is acquired according to a signal from the brake stroke sensor 23, and indicates that a brake is OFF in a case where a driver does not press the brake pedal, and indicates that the brake is ON in a case where the driver presses the brake pedal. The master cylinder pressure is acquired according to a signal from the master cylinder pressure sensor 24, and indicates the magnitude of the brake pedal force. The seat angular velocity is acquired according to a signal from the seat angular velocity sensor 25, and indicates the pitch angular velocity of the seat 2. The longitudinal acceleration is acquired according to a signal from the acceleration sensor 22, and indicates the longitudinal acceleration acting on the seat 2. In Step S1, the longitudinal acceleration of the seat 2 is detected as a representative value of unsprung longitudinal acceleration and sprung longitudinal acceleration of the vehicle Ve. In such a manner, in Step S1, the control unit 11 linearly detects the brake pedal force by the master cylinder pressure sensor 24 in addition to the seat angular velocity by the seat angular velocity sensor 25 and the longitudinal acceleration by the acceleration sensor 22.

The control unit 11 determines whether the brake is ON (Step S2). On the basis of the signal from the brake stroke sensor 23, it is determined in Step S2 whether the brake pedal is pressed. In Step S2, by utilization of the brake signal acquired in Step S1, it is determined whether the brake is switched from OFF to ON or whether the brake is ON continuously.

In a case where it is determined that the brake is not ON (Step S2: No), this control routine is ended.

In a case where it is determined that the brake is ON (Step S2: Yes), the control unit 11 calculates a deviation σ between a target value A and actual seat angular velocity for the seat angular velocity that is the pitch angular velocity of the seat 2 (Step S3). In Step S3, by utilization of the seat angular velocity (actual seat acceleration) acquired in Step S1 and the preset target value A, the deviation σ is acquired by subtraction of the seat actual acceleration from the target value A. The target value A is set to zero as a value indicating that the seat 2 is in a basic posture, that is, a value indicating that the seat cushion 2*a* is in the horizontal state. The basic posture indicates a posture of the seat 2 before the braking or a posture of the seat 2 in a state in which the vehicle is stopped. For example, a posture in which the seat cushion 2*a* is kept horizontal is the basic posture. Thus, the deviation σ is a value indicating how much the posture of the seat 2 is deviated from the basic posture in the pitch direction.

Furthermore, since the pitch angular velocity of the seat 2 has a rotation direction, the seat angular velocity has a positive value in one direction and a negative value in the other direction. In this description, the seat angular velocity becomes a positive value in a case where the front portion of the seat 2 moves downward with respect to the basic posture, and the seat angular velocity becomes a negative value in a case where the front portion of the seat 2 moves upward with respect to the basic posture. In other words, in a case where the front portion of the seat cushion 2*a* moves downward from the position before the braking due to the sinking behavior of the seat 2 at the time of the braking, the seat angular velocity becomes the positive value. In a case where the front portion of the seat cushion 2*a* moves upward from the position before the braking due to the subsequent rocking-back behavior of the seat 2, the seat angular velocity becomes the negative value. Thus, the deviation σ calculated in Step S3 is the positive value or the negative value. In a case where the front portion of the seat 2 moves downward from the position before the braking, the seat angular velocity becomes the positive value, whereby the deviation σ, which is a value acquired by subtraction of the actual seat angular velocity from the target value A, becomes the negative value. In a case where the front portion of the seat 2 moves upward from the position before the braking, the seat angular velocity becomes the negative value, whereby the deviation σ, which is the value acquired by subtraction of the actual seat angular velocity from the target value A, becomes the positive value. That is, by determining whether the deviation σ is the positive value or the negative value, the control unit 11 can detect the rotation direction of the seat 2 in the pitch direction and can detect the magnitude of the movement of the seat 2 in the pitch direction on the basis of the magnitude of the value.

Subsequently, when calculating the deviation σ between the target value A and the actual seat angular velocity in Step S3, the control unit 11 controls the driving of the actuator 3 according to a calculation result of any one of first angular velocity calculation, second angular velocity calculation, and third angular velocity calculation. Note that it is assumed that the processing in Step S3 is included in the first angular velocity calculation in this processing flow.

When the processing of Step S3 is performed, the control unit 11 determines whether a change rate ΔJ1 of the seat angular velocity is equal to or larger than a first set value Ja or whether a change rate ΔM1 of the master cylinder pressure is equal to or larger than a first threshold Mb (Step S4). ΔJ1 indicates a change amount per unit time of the seat angular velocity. ΔM1 indicates a change amount per unit time of the master cylinder pressure. Since the master cylinder pressure indicates the brake pedal force, ΔM1 indicates a change amount in the brake pedal force per unit time. The first set value Ja is a preset value and indicates a threshold of the seat angular velocity in the first angular velocity calculation. The first threshold Mb is a preset value and indicates a threshold of the master cylinder pressure in the first angular velocity calculation.

In Step S4, the control unit 11 determines whether the sinking behavior is generated in the seat 2 by using the change rate ΔJ1 of the seat angular velocity and the first set value Ja. In a case where the change rate ΔJ1 of the seat angular velocity is equal to or larger than the first set value Ja, the control unit 11 determines that the sinking behavior is generated in the seat 2.

Furthermore, by using the change rate ΔM1 of the master cylinder pressure and the first threshold Mb, the control unit 11 determines in Step S4 whether the sinking behavior of the seat 2 is generated. In other words, on the basis of the master cylinder pressure signal, the control unit 11 determines whether brake pedal force that generates the sinking behavior of the seat 2 is generated. In short, on the basis of an increase rate of the brake pedal force before the posture of the seat 2 changes from the basic posture, the control unit 11 determines whether there is a possibility that the sinking behavior of the seat 2 is generated. In a case where the increase rate of the brake pedal force is equal to or larger than a predetermined threshold, it is determined that the sinking behavior of the seat 2 is to be generated. Thus, when the change rate ΔM1 of the master cylinder pressure is equal to or larger than the first threshold Mb, the control unit 11 determines that there is a possibility that the sinking behavior of the seat 2 is generated due to the rapid increase in the brake pedal force.

In a case where positive determination is made in Step S4 (Step S4: Yes), the control unit 11 performs calculation processing to bring the pitch angular velocity of the seat 2 close to the target value A (Step S5). In Step S5, control for reducing an absolute value of the deviation σ is executed. In Step S5, the control unit 11 executes PID control and FF control. In a case where the absolute value of the deviation σ is a large value, the control unit 11 executes the FF control. Then, in a case where the absolute value of the deviation σ is a small value, the control unit 11 executes the PID control.

Furthermore, the control unit 11 determines whether the deviation σ is a negative value (Step S6). In Step S6, it is determined whether the deviation σ calculated in Step S3 is the negative value. In Step S6, the control unit 11 determines whether the sinking behavior of the seat 2 is generated.

In a case where it is determined in Step S6 that the deviation σ is the negative value (Step S6: Yes), the control unit 11 determines that the first angular velocity due to the sinking behavior is generated, and causes the actuator 3 to output force in an opposite phase to the seat angular velocity (Step S7). In Step S7, the control unit 11 controls the driving of the actuator 3, and the force acting in the rotation direction opposite to the first angular velocity is output from the actuator 3. The sinking behavior of the seat 2 is reduced when the force in the pitch direction which force is output from the actuator 3 acts on the seat 2.

The processing of Step S7 is processing executed in a case where the positive determination is made in Step S4. The case where the positive determination is made in Step S4 is a case where either one of a case where the change rate ΔJ1 of the seat angular velocity is equal to or larger than the first set value Ja and a case where the change rate ΔM1 of the master cylinder pressure is equal to or larger than the first threshold Mb is satisfied.

Thus, in a case where the positive determination is made in Step S4 since the change rate ΔJ1 of the seat angular velocity is equal to or larger than the first set value Ja and in a case where positive determination is made in Step S6, the control unit 11 determines that the sinking behavior of the seat 2 is generated, and causes the actuator 3 to output the force in the direction opposite to the movement of the seat 2 in the pitch direction in Step S7. The actuator 3 outputs force in a direction opposite to a downward movement of the front portion of the seat 2, that is, force to reduce the sinking behavior of the seat 2.

On the other hand, in a case where the positive determination is made in Step S4 since the change rate ΔM1 of the master cylinder pressure is equal to or larger than the first threshold Mb and a case where the positive determination is made in Step S6, the control unit 11 determines in Step S7 that there is a possibility that the sinking behavior of the seat 2 is generated, and causes the actuator 3 to output the force in the direction opposite to the first angular velocity. The actuator 3 outputs force in a direction opposite to the force with which the front portion of the seat 2 tries to move downward, that is, force to control generation of the sinking behavior of the seat 2.

A scene where the processing of Step S7 is performed is immediately after the start of braking at the time of sudden braking. By performing the processing of Step S7 on the sinking behavior of the vehicle Ve at the time of the sudden braking, it is possible to control the sinking of the seat 2 by applying force in the opposite phase to the first angular velocity by the actuator 3, and to control a movement of the occupant. Then, this control routine is ended when the processing of Step S7 is performed. The case where the processing of Step S7 is performed is a case where the driving of the actuator 3 is controlled according to a calculation result of the first angular velocity calculation.

In a case where it is determined in Step S6 that the deviation σ is not the negative value (Step S6: No), the control unit 11 causes the actuator 3 to output force in the same phase as the seat angular velocity (Step S8). In Step S8, the control unit 11 controls the driving of the actuator 3, and force acting in the rotation direction in the same direction as the seat angular velocity (angular velocity in the direction opposite to the first angular velocity) is output from the actuator 3. This control routine is ended when the processing of Step S8 is performed.

In a case where negative determination is made in Step S4 (Step S4: No), the control unit 11 determines whether a change rate ΔJ2 of the seat angular velocity is equal to or larger than a second set value Jb and smaller than a third set value Jc, or whether a change rate ΔM2 of the master cylinder pressure is equal to or larger than the first threshold Mb and smaller than a second threshold Mc (Step S9). ΔJ2 indicates a change amount per unit time of the seat angular velocity. ΔM2 indicates a change amount per unit time of the master cylinder pressure. The second set value Jb is a preset value and indicates a lower limit (threshold) of the seat angular velocity in the second angular velocity calculation. The third set value Jc is a preset value and indicates an upper limit (threshold) of the seat angular velocity in the second angular velocity calculation. The first threshold Mb indicates a lower limit (threshold) of the master cylinder pressure in the second angular velocity calculation. The second threshold Mc is a preset value and indicates an upper limit (threshold) of the master cylinder pressure in the second angular velocity calculation.

In Step S9, the control unit 11 uses the change rate ΔJ2 of the seat angular velocity, the second set value Jb, and the third set value Jc and determines whether the rocking-back behavior is generated in the seat 2. In a case where the change rate ΔJ2 of the seat angular velocity is equal to or larger than the second set value Jb and smaller than the third set value Jc, the control unit 11 determines that the rocking-back behavior is generated in the seat 2.

In addition, in Step S9, the control unit 11 uses the change rate ΔM2 of the master cylinder pressure, the first threshold Mb, and the second threshold Mc and determines whether the brake pedal force causing the seat 2 to rock back is generated. In this case, before the posture of the seat 2 changes from the basic posture, that is, without depending on the movement of the seat 2 in the pitch direction, it is determined on the basis of the change rate of the brake pedal force whether there is a possibility that the rocking-back behavior of the seat 2 is generated. Thus, in a case where the change rate ΔM2 of the master cylinder pressure is equal to or larger than the first threshold Mb and smaller than the second threshold Mc, the control unit 11 determines that there is a possibility that the rocking-back behavior is generated in the seat 2 due to the change in the brake pedal force.

In a case where positive determination is made in Step S9 (Step S9: Yes), the control unit 11 performs calculation processing to bring the pitch angular velocity of the seat 2 close to the target value A (Step S10). In Step S10, control for reducing an absolute value of the deviation σ is executed. In Step S10, the control unit 11 executes PID control and FF control. In a case where the absolute value of the deviation σ is a large value, the control unit 11 executes the FF control. Then, in a case where the absolute value of the deviation σ is a small value, the control unit 11 executes the PID control.

Furthermore, the control unit 11 determines whether the deviation σ is a negative value (Step S11). In Step S11, it is determined whether the deviation σ calculated in Step S3 is the negative value. In Step S11, the control unit 11 determines whether the rocking-back behavior of the seat 2 is generated.

In a case where it is determined in Step S11 that the deviation σ is the negative value (Step S11: Yes), the control unit 11 causes the actuator 3 to output force in an opposite phase to the seat angular velocity (Step S12). In Step S12, the control unit 11 controls the driving of the actuator 3, and force acting in the rotation direction opposite to the seat angular velocity (angular velocity in the direction opposite to the second angular velocity) is output from the actuator 3. This control routine is ended when the processing of Step S12 is performed.

In a case where it is determined in Step S11 that the deviation σ is not the negative value (Step S11: No), the control unit 11 determines that the second angular velocity is generated as the rocking-back behavior, and causes the actuator 3 to output force in the same phase as the seat angular velocity (Step S13). In Step S13, the control unit 11 controls the driving of the actuator 3, and the force acting in the rotation direction that is in the same direction as the second angular velocity is output from the actuator 3. Force acting in the rotation direction opposite to the first angular velocity is output from the actuator 3. The rocking-back behavior of the seat 2 is reduced when the force in the pitch direction which force is output from the actuator 3 acts on the seat 2.

The processing of Step S13 is processing executed in a case where the positive determination is made in Step S9. The case where positive determination is made in Step S9 is a case where either one of a case where the change rate ΔJ2 of the seat angular velocity is equal to or larger than the second set value Jb and smaller than the third set value Jc and a case where the change rate ΔM2 of the master cylinder pressure is equal to or larger than the first threshold Mb and smaller than the second threshold Mc is satisfied.

Thus, in a case where the positive determination is made in Step S9 since the change rate ΔJ2 of the seat angular velocity is equal to or larger than the second set value Jb and smaller than the third set value Jc and in a case where negative determination is made in Step S11, the control unit 11 determines that the rocking-back behavior of the seat 2 is generated, and causes the actuator 3 to output force in the same direction with respect to the movement in the pitch direction of the seat 2 in Step S13. The actuator 3 outputs force in the same direction as an upward movement of the front portion of the seat 2.

On the other hand, in a case where the positive determination is made in Step S9 since the change rate ΔM2 of the master cylinder pressure is equal to or larger than the first threshold Mb and smaller than the second threshold Mc and in a case where the negative determination is made in Step S11, the control unit 11 determines that there is a possibility that a rocking-back behavior of the seat 2 is generated, and causes the actuator 3 to output force in the same direction as the direction of the second angular velocity in Step S13. The actuator 3 outputs force in the same direction as force with which the front portion of the seat 2 tries to move upward.

The scene in which the processing of Step S13 is performed is a scene in which the second angular velocity is generated as the rocking-back behavior before the vehicle Ve stops. By performing the processing of Step S13, it is possible to control the posture of the seat 2 by applying the force in the same phase as the second angular velocity by the actuator 3, and to control forward movement of the upper body of the occupant. Then, this control routine is ended when control in Step S13 is performed. The case where the processing of Step S13 is performed is a case where the driving of the actuator 3 is controlled according to a calculation result of the second angular velocity calculation.

In a case where negative determination is made in Step S9 (Step S9: No), the control unit 11 determines whether a change rate ΔJ3 of the seat angular velocity is equal to or larger than the second set value Jb and smaller than the third set value Jc, or whether a change rate ΔM3 of the master cylinder pressure is equal to or larger than the first threshold Mb and smaller than the second threshold Mc (Step S14). ΔJ3 indicates a change amount per unit time of the seat angular velocity. ΔM3 indicates a change amount per unit time of the master cylinder pressure. The second set value Jb indicates a lower limit (threshold) of the seat angular velocity in the third angular velocity calculation. The third set value Jc indicates an upper limit (threshold) of the seat angular velocity in the third angular velocity calculation. The first threshold Mb indicates a lower limit (threshold) of the master cylinder pressure in the third angular velocity calculation. The second threshold Mc indicates an upper limit (threshold) of the master cylinder pressure in the third angular velocity calculation.

In Step S14, the control unit 11 uses the change rate ΔJ3 of the seat angular velocity, the second set value Jb, and the third set value Jc and determines whether the rocking-back behavior of the seat 2 is generated. In a case where the change rate ΔJ3 of the seat angular velocity is equal to or larger than the second set value Jb and smaller than the third set value Jc, the control unit 11 determines that the rocking-back behavior is generated in the seat 2.

In addition, in Step S14, the control unit 11 uses the change rate ΔM3 of the master cylinder pressure, the first threshold Mb, and the second threshold Mc and determines whether the brake pedal force causing the rocking-back behavior of the seat 2 is generated. In this case, on the basis of the change rate of the brake pedal force, it is determined whether there is a possibility that the rocking-back behavior of the seat 2 is generated. Thus, in a case where the change rate ΔM3 of the master cylinder pressure is equal to or larger than the first threshold Mb and smaller than the second threshold Mc, the control unit 11 determines that there is a possibility that the rocking-back behavior is generated in the seat 2 due to a sudden change in the brake pedal force.

In a case where negative determination is made in Step S14 (Step S14: No), this control routine is ended.

In a case where positive determination is made in Step S14 (Step S14: Yes), the control unit 11 performs calculation processing to bring the pitch angular velocity of the seat 2 close to the target value A (Step S15). In Step S15, control for reducing an absolute value of the deviation σ is executed. In Step S15, the control unit 11 executes PID control and FF control. In a case where the absolute value of the deviation σ is a large value, the control unit 11 executes the FF control. Then, in a case where the absolute value of the deviation σ is a small value, the control unit 11 executes the PID control.

Furthermore, the control unit 11 determines whether the deviation σ is a negative value (Step S16). In Step S16, it is determined whether the deviation σ calculated in Step S3 is the negative value. In Step S16, the control unit 11 determines whether the rocking-back behavior of the seat 2 is generated.

In a case where it is determined in Step S16 that the deviation σ is the negative value (Step S16: Yes), the control unit 11 determines that the third angular velocity due to the rocking-back behavior is generated, and causes the actuator 3 to output force in an opposite phase to the seat angular velocity (Step S17). In Step S17, the control unit 11 controls the driving of the actuator 3, and force acting in the rotation direction opposite to the third angular velocity is output from the actuator 3. The rocking-back behavior of the seat 2 is reduced when the force in the pitch direction which force is output from the actuator 3 acts on the seat 2.

The processing of Step S17 is processing executed in a case where the positive determination is made in Step S14. The case where the positive determination is made in Step S14 is a case where either one of a case where the change rate ΔJ3 of the seat angular velocity is equal to or larger than the second set value Jb and smaller than the third set value Jc and a case where the change rate ΔM3 of the master cylinder pressure is equal to or larger than the first threshold Mb and smaller than the second threshold Mc is satisfied.

Thus, in a case where the positive determination is made in Step S14 since the change rate ΔJ3 of the seat angular velocity is equal to or larger than the second set value Jb and smaller than the third set value Jc and in a case where positive determination is made in Step S16, the control unit 11 determines that the rocking-back behavior of the seat 2 is generated, and causes the actuator 3 to output force in the direction opposite to the movement in the pitch direction of the seat 2 in Step S17. The actuator 3 outputs force in a direction opposite to the downward movement of the front portion of the seat 2, that is, force to reduce the rocking-back behavior of the seat 2.

On the other hand, in a case where the positive determination is made in Step S14 since the change rate ΔM3 of the master cylinder pressure is equal to or larger than the first threshold Mb and smaller than the second threshold Mc and in a case where the positive determination is made in Step S16, the control unit 11 determines that there is a possibility that the rocking-back behavior of the seat 2 is generated, and causes the actuator 3 to output force in the direction opposite to the direction of the third angular velocity in Step S17. The actuator 3 outputs force in the direction opposite to the force with which the front portion of the seat 2 tries to move downward, that is, force to control generation of the rocking-back behavior of the seat 2.

The scene in which the processing of Step S17 is performed is a scene in which the third angular velocity is generated as the rocking-back behavior before the vehicle Ve stops. By performing the processing of Step S17, it is possible to control the posture of the seat 2 in the opposite phase to the third angular velocity, to control the shake of the seat 2, and to control the vibration of the occupant. Then, this control routine is ended when the control of Step S17 is performed. The case where the processing of Step S17 is performed is a case where the driving of the actuator 3 is controlled according to a calculation result of the third angular velocity calculation.

In a case where it is determined in Step S16 that the deviation σ is not the negative value (Step S16: No), the control unit 11 causes the actuator 3 to output the force in the same phase as the seat angular velocity (Step S18). In Step S18, the control unit 11 controls the driving of the actuator 3, and the force acting in the rotation direction in the same direction as the seat angular velocity (angular velocity in the direction opposite to the third angular velocity) is output from the actuator 3. This control routine is ended when the processing of Step S18 is performed.

As illustrated in FIG. 4, the control unit 11 performs the processing of Steps S3 to S8 as the first angular velocity calculation, performs the processing of Steps S9 to S13 as the second angular velocity calculation, and performs the processing in Steps S14 to S18 as the third angular velocity calculation.

Figure 5:
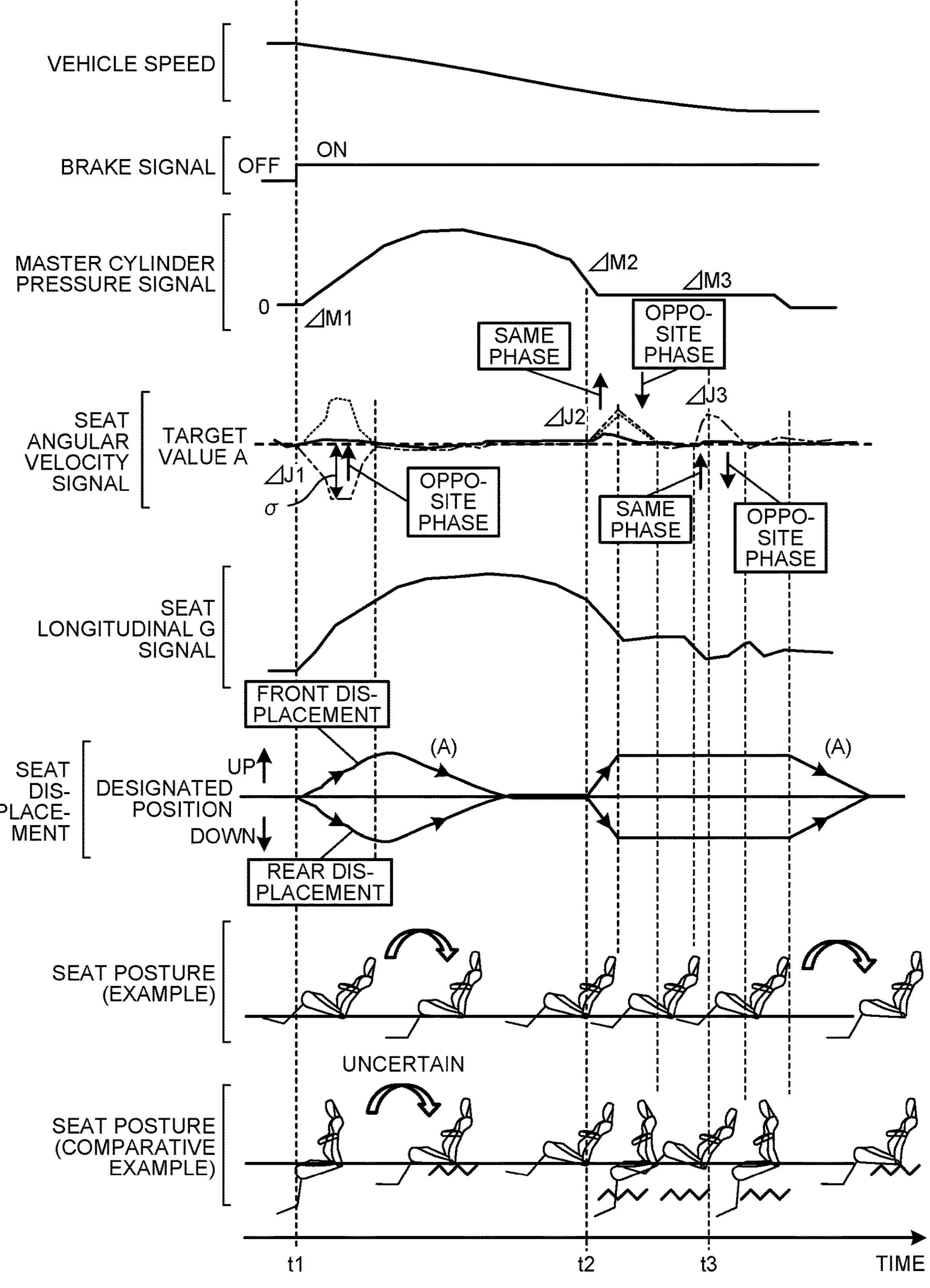
FIG. 5 is a time chart illustrating a control state and a behavior of a seat at the time of braking according to an embodiment.

FIG. 5 is a time chart illustrating a control state and a behavior of a seat at the time of braking. In FIG. 5, a case where the seat control device 1 executes the seat control is illustrated as an example, and a conventional configuration is illustrated as a comparative example. In the seat angular velocity signal illustrated in FIG. 5, a solid line represents actual angular velocity of the example, a broken line represents a control amount of the example, and a two-dot chain line represents actual angular velocity of the comparative example. Furthermore, seat displacement represents displacement in the example.

When the driver presses the brake pedal while the vehicle Ve is traveling at a predetermined vehicle speed, a brake signal indicating that the brake is ON is input to the seat control device 1 (time t1). At time t1, the vehicle Ve starts braking.

Immediately after time t1, the master cylinder pressure rapidly increases. This is a sudden braking request. Thus, longitudinal acceleration acting on the seat 2 (hereinafter, referred to as seat longitudinal acceleration) rapidly increases. The seat longitudinal acceleration is constant in the rear direction from the start of the braking until the stop of the vehicle, and changes in magnitude in a manner of increasing or decreasing in the certain direction (rear direction). At this time, when the change rate ΔM1 of the master cylinder pressure exceeds the first threshold Mb, the seat control device 1 causes the actuator 3 to output the force in the opposite phase to the seat angular velocity. That is, the seat control device 1 controls the driving of the actuator 3 in such a manner as to control the sinking behavior of the seat 2 immediately after the start of the braking. Thus, the downward movement of the front portion of the seat 2 is controlled. In a case where no control is executed as in the comparative example, a sinking behavior in which a front portion of a seat moves downward is generated.

Specifically, the example and the comparative example will be compared with each other with a focus being on a seat angular velocity signal, a seat posture, and seat displacement. First, in the comparative example, as represented by the two-dot chain line in the seat angular velocity signal, the seat angular velocity greatly deviates from the target value A, and the deviation σ is generated as a negative value. Thus, as illustrated in the comparative example of the seat posture, a sinking behavior is generated in a seat, and a front portion of the seat moves downward from a position before the braking. Furthermore, since the seat posture changes in an uncertain manner after the sinking, vibration (represented by a wavy line in FIG. 5) due to sliding of an occupant with friction on a seat surface of a seat cushion is generated.

On the other hand, in the seat posture of the example, the posture of the seat 2 is changed in such a manner that the front portion of the seat 2 moves upward from the position before the braking. This is because, as represented by the broken line in the seat angular velocity signal, a control amount of the seat angular velocity that cancels the change amount (deviation σ) of the seat angular velocity of the conventional configuration acts on the seat 2, that is, the force in the opposite phase to the first angular velocity is output from the actuator 3. As a result, as represented by the solid line in the seat angular velocity signal, the actual angular velocity shifts to a side of a positive value with respect to the target value A.

Furthermore, the front portion of the seat 2 moves upward from a designated position as represented by front displacement in the seat displacement, and a rear portion of the seat 2 moves downward from the designated position as represented by rear displacement in the seat displacement. The designated position is a position before the braking or a position of the basic posture. Then, as illustrated in part (A) with respect to the front displacement and the rear displacement, the seat control device 1 actively and gradually changes the seat displacement to the designated position. That is, after changing the posture of the seat 2 in such a manner as to control the sinking behavior of the seat 2, the seat control device 1 gradually changes the posture of the seat 2 toward the basic posture in such a manner as not to make the occupant seated on the seat 2 aware of the change. As a result, it is possible to control generation of vibration caused by sliding of the occupant with friction on the seat surface of the seat cushion 2*a*.

Subsequently, when the master cylinder pressure and the seat longitudinal acceleration start to decrease and the brake vibration comes to stop, it is determined that the rocking-back behavior of the seat 2 is to be generated (time t2). At time t2, it is determined that the second angular velocity as the rocking-back behavior is to be generated, whereby the driving of the actuator 3 is controlled in such a manner as to output the force in the same phase as the second angular velocity. The case where it is determined that the rocking-back behavior is to be generated at time t2 is a case where the brake pedal force becomes smaller than that at the start of the braking, and the longitudinal acceleration acting on the seat 2 is in the constant direction and decreases.

Immediately after time t2, in the example, as represented by a broken line in the seat angular velocity signal, since the force in the same phase as the second angular velocity acts, the actual angular velocity shifts to a side of a positive value with respect to the target value A. While the seat longitudinal acceleration decreases, the force in the same phase as the second angular velocity is output from the actuator 3. As illustrated in the seat posture of the example, the front portion of the seat 2 is controlled to move upward from the position before the braking. That is, the front portion of the seat 2 moves upward from a designated position as indicated by the front displacement of the seat displacement, and the rear portion of the seat 2 moves downward from the designated position as indicated by the rear displacement of the seat displacement. Then, when the seat longitudinal acceleration changes from a decrease to an increase, the seat control device 1 causes the actuator 3 to output force in an opposite phase to the second angular velocity and stabilizes the posture of the occupant.

Subsequently, when the upper body of the occupant is settled, it is determined that the third angular velocity is generated as the rocking-back behavior (time t3). At time t3, it is determined that the third angular velocity is generated as the rocking-back behavior, whereby the driving of the actuator 3 is controlled in such a manner as to output the force in the opposite phase to the third angular velocity.

Immediately after time t3, in the example, as indicated by a solid line in the seat angular velocity signal, since the force in the opposite phase to the third angular velocity acts on the seat 2, the actual angular velocity shifts along the target value A. While the seat longitudinal acceleration increases, force in the opposite phase to the third angular velocity is output from the actuator 3. As illustrated in the seat posture of the example, the front portion of the seat 2 is controlled to move upward from the position before the braking. That is, the front portion of the seat 2 moves upward from a designated position as indicated by the front displacement of the seat displacement, and the rear portion of the seat 2 moves downward from the designated position as indicated by the rear displacement of the seat displacement. As a result, the downward movement of the front portion of the seat 2 can be controlled and the vibration of the seat 2 can be controlled.

After the rocking-back behavior is controlled, as illustrated in part (A) with respect to the front displacement and the rear displacement, the seat control device 1 actively and gradually shifts the seat displacement to the designated position. That is, after changing the posture of the seat 2 in such a manner as to control the rocking-back behavior of the seat 2, the seat control device 1 gradually changes the posture of the seat 2 toward the basic posture in such a manner as not to make the occupant seated on the seat 2 aware of the change.

On the other hand, as illustrated in the seat posture of the comparative example, after time t2, the seat continues the rocking-back behavior in such a manner that the front portion of the seat moves downward from a position before the braking, the front portion of the seat moves upward from the position before the braking, and the front portion of the seat moves upward from the position before the braking. Furthermore, the seat posture changes in an uncertain manner after the rocking back. Thus, in the comparative example, vibration is generated due to sliding of the occupant with friction on a seat surface of a seat cushion after time t2.

As described above, according to the embodiment, the posture of the seat 2 can be appropriately controlled with respect to the sinking behavior and the rocking-back behavior from the start of the braking of the vehicle Ve until the stop thereof. Accordingly, ride comfort can be improved.

Figure 6:
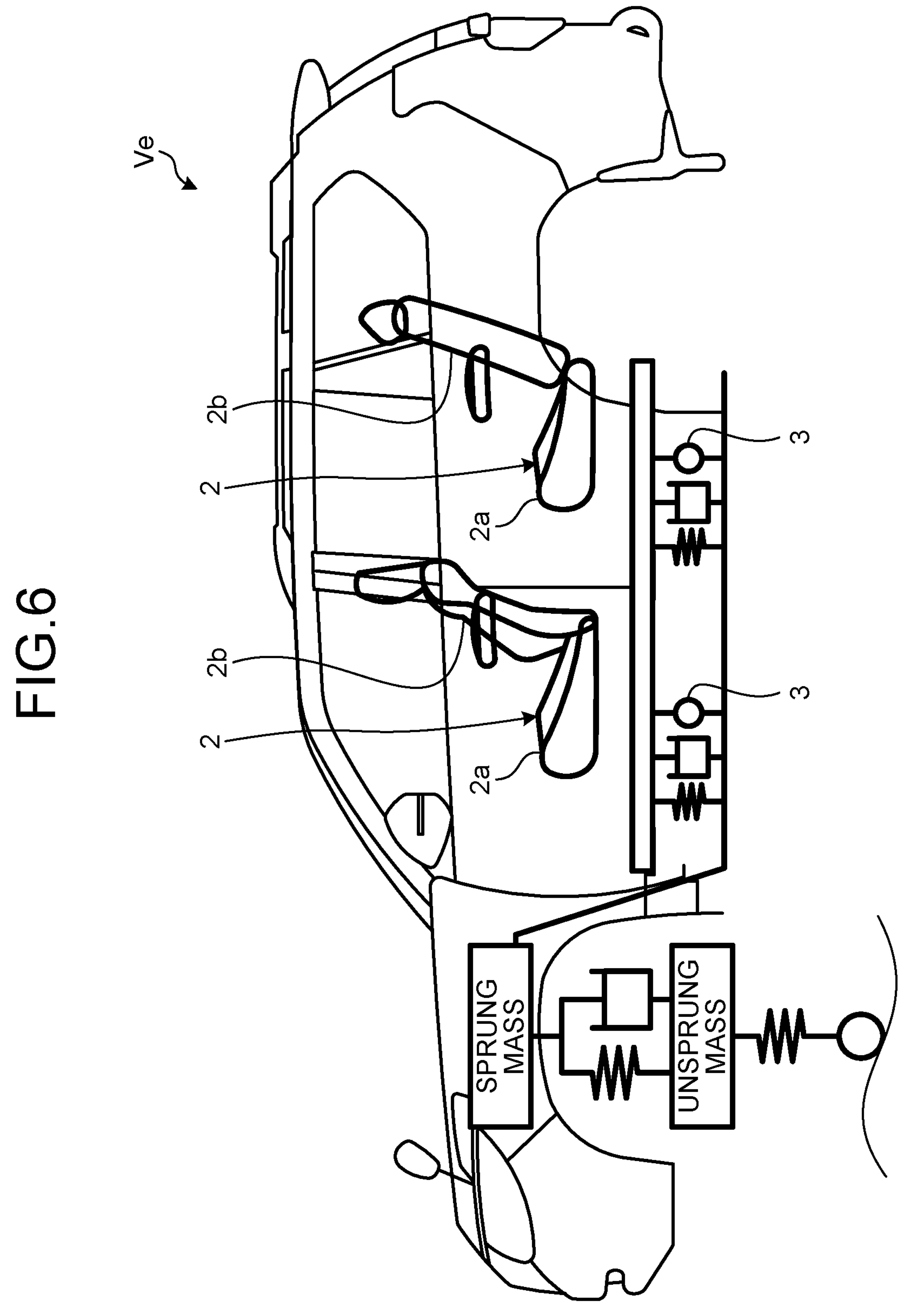
FIG. 6 is a view illustrating a modification example of a vehicle on which the seat control device is mounted.

Furthermore, as a first modification example, as illustrated in FIG. 6, a posture of a seat 2 can be appropriately controlled by damping an entire floor of a vehicle Ve. An actuator 3 of the first modification example is configured to be able to rotate the entire floor of the vehicle Ve in a pitch direction. A seat control device 1 is configured to control the posture of the seat 2 by controlling driving of the actuator 3 and to control a posture of the entire floor of the vehicle Ve.

In addition, as a second modification example, it is possible to include an actuator 3 capable of separately moving a seat cushion 2*a* and a seat back 2*b* of a seat 2. In the second modification example, the seat 2 is configured in such a manner that the seat cushion 2*a* and the seat back 2*b* can move independently. Furthermore, the actuator 3 includes a front actuator capable of rotating the seat cushion 2*a* in a pitch direction and a rear actuator capable of rotating the seat back 2*b* in the pitch direction. Thus, a seat control device 1 can independently control a posture of the seat cushion 2*a* and a posture of the seat back 2*b* by executing the seat control.

Furthermore, in the second modification example, at time t1 illustrated in FIG. 5, the front actuator of the actuator 3 changes the posture of the seat cushion 2*a* in such a manner that a front portion of the seat cushion 2*a* moves upward from a position before braking, and the rear actuator of the actuator 3 changes the posture of the seat back 2*b* in such a manner that a rear portion of the seat back 2*b* moves downward from the position before the braking. Then, the posture of the seat back 2*b* is maintained to be this posture from time t1 until the stop of a vehicle. That is, rear displacement of seat displacement is maintained in a state of being moved downward from a designated position. On the other hand, the posture of the seat cushion 2*a* is actively changed to the designated position as illustrated in part (A) in front displacement of the seat displacement. That is, similarly to the front displacement of the seat displacement in the embodiment, after time t2, the front actuator of the actuator 3 changes the posture of the seat cushion 2*a* in such a manner that the front portion of the seat cushion 2*a* moves upward from the position before the braking. Then, at timing at which the vehicle Ve stops, the front actuator returns the seat cushion 2*a* to the designated position, and the rear actuator returns the seat back 2*b* to the designated position. As a result, the seat 2 can be returned to the basic posture.

In the present disclosure, a posture of a seat can be appropriately controlled from the start of the braking until the stop of the vehicle. Specifically, by executing the second control after execution of the first control until the stop of the vehicle, it is possible to control a movement of an upper body of an occupant in a direction away from the seat. This improves ride comfort.

According an embodiment, a posture of a seat can be appropriately controlled from the start of braking of a vehicle until the stop of the vehicle. Specifically, by executing the second control after execution of the first control until the stop of the vehicle, it is possible to control a movement of an upper body of an occupant in a direction away from the seat. This improves ride comfort.

According an embodiment, it is possible to accurately detect a sinking behavior of the seat which behavior is generated immediately after the start of the braking.

According an embodiment, it is possible to accurately detect a rocking-back behavior generated after the execution of the first control until the stop of the vehicle.

According an embodiment, it is possible to accurately detect a vibration of the seat in a pitch direction which vibration is generated after the execution of the second control until the stop of the vehicle.

According an embodiment, the first control and the second control can be executed for each of the plurality of seats provided in the vehicle.

According an embodiment, it is possible to change postures of the plurality of seats provided in the vehicle by moving the entire floor of the vehicle in the pitch direction.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A seat control device that controls driving of an actuator for changing a posture of a seat on which an occupant of a vehicle is seated and that controls the posture of the seat in braking of the vehicle, wherein in a case when determining that a sinking behavior in which a front portion of the seat moves downward from a position before the braking is generated at a start of the braking of the vehicle, the seat control device executes first control of causing the actuator to output force in a direction opposite to pitch angular velocity of the seat, and in a case when determining that a rocking-back behavior in which the front portion of the seat moves upward from the position before the braking is generated after the execution of the first control until a stop of the vehicle, the seat control device executes second control of causing the actuator to output force in a same direction as the pitch angular velocity of the seat, wherein the case when determining that the sinking behavior is generated refers to a case when, by continuously monitoring an amount of brake pedal force, a change rate in brake pedal force is equal to or larger than a threshold is satisfied, the threshold based on an angular velocity calculation.

2. The seat control device according to claim 1, wherein the case when determining that the rocking-back behavior is generated refers to a case when the brake pedal force becomes smaller than that at the start of the braking and longitudinal acceleration acting on the seat is in a constant direction and decreased.

3. The seat control device according to claim 1, wherein in a case when determining that a behavior in which the front portion of the seat moves downward from the position before the braking is generated after the execution of the second control until the stop of the vehicle, the seat control device performs the first control.

4. The seat control device according to claim 3, wherein a plurality of the seats is provided in the vehicle, and the actuator is provided in each of the plurality of seats, and the seat control device executes the first control and the second control for each of the plurality of seats.

5. The seat control device according to claim 3, wherein a plurality of the seats is provided on a floor of the vehicle, and the actuator is configured to move the entire floor in a pitch direction of the vehicle, and the seat control device executes the first control and the second control in such a manner that the entire floor moves in the pitch direction of the vehicle.

* * * * *